No. 777,794.

Patented December 20, 1904.

UNITED STATES PATENT OFFICE.

HENRY JAMES LIVINGSTON, OF BALTIMORE, MARYLAND.

COMPOSITION.

SPECIFICATION forming part of Letters Patent No. 777,794, dated December 20, 1904.

Application filed September 21, 1903. Serial No. 173,961.

*To all whom it may concern:*

Be it known that I, HENRY JAMES LIVINGSTON, a British subject, residing at Baltimore, in the State of Maryland, have invented a new and useful Composition, of which the following is a specification.

I use the word "annealing" to express the imparting of additional adhesive qualities to cement and of toughening and of weather-proofing it. To avoid repetition, I use the word "cement" in its popular sense to include all hydraulic cement mortar, concrete, or artificial stone made with hydraulic cement.

It is well known that cement, while effectually binding bricks or stones together, has little or no binding power when applied to cement which has become set or partially hardened, an operation taking place very rapidly. Hence the required conditions for successful combination of cement-work unless carried on continuously are impossible, particularly so in concrete building, where each day's work setting separately forms a distinct mass, lying alongside its neighbors and having no bond with them. Again, cement-work exposed to the destructive action of the weather usually fails to resist the same for any length of time. If, however, it can be protected against direct weather action for some weeks its weather-resisting qualities are materially increased, so that the work may be made very durable.

Attempts have been made to bring about a union of set cement with new or of two or more pieces of cement which have already set by washing the old surfaces with cement grout or acid or alkaline solution; but these do not afford any assistance, inasmuch as they do not give any binding power, nor do they prevent the new cement from contraction and leaving the old work when the former is setting.

The first object of my invention, therefore, is to induce the crystallization of an added cement joint between two bodies of cement of such a nature that its particles shall adhere to the old work while they are setting and at the same time shall form part of any new work immediately following or of any added old work. The interior body of the whole work being thus bonded and an outer coat of the exterior surface, where such is required, made to adhere to the whole by a similar bond, these form a homogeneous mass. I prefer to make expansion-joints in the outer skin only. In exclusively interior work my process similarly applied will join floors to beams or one layer of flooring to another and make one homogeneous body instead of a weaker agglomeration of separate pieces. It will also enable old or damaged work to be repaired equal to new. I next afford extra protection against weather action to the exposed exterior wherever such protection can be applied.

I have discovered that neat cement mixed or made up with a diluted solution of crude hydrocarbonaceous matter insoluble in cold water and with the lesser soluble components removed furnishes a means of strongly binding cement in the desired described manner. The solution is to be used instead of the ordinary mixing-water with the neat cement for the bonds, and the cement so treated, hereinafter called "annealed cement," is to be applied in joints not under one-eighth of an inch thick to the previously well-damped old cement, preferably roughened, and is to be followed as quickly as possible by the succeeding work. I find that no contraction or shrinkage takes place at the points of contact, but that a strong and permanent union results, making the joints the strongest part of the work. In preparing such a solution I find that the best and most economical results are obtained from digesting coal-tar in hot water for a few minutes at 170° to 200° Fahrenheit. This heat should scarcely be exceeded, because the heavier oily components, which are very objectionable, may become liberated. The proportions of hot water to coal-tar are about eighteen or twenty to one. After stirring and settling the clear liquid is to be drawn off and used exactly as is ordinary mixing-water. This substitution has the effect of annealing or toughening the cement and imparting to it the required properties, as described above.

It is to be noticed that by using my composition there is only about .50 per cent. of innocuous carbonaceous matter added to the cement used for joints.

I do not claim that my composition will enable defective cement to do the work of sound, especially for surface-work exposed to the weather. I prefer under such conditions Portland cement, which while otherwise satisfactory contains not more than one and one-half sulfuric anhydrid or four per cent. of magnesia and sulfuric anhydrid together. I am aware that cold water in which coal-tar has been stirred and when drawn off known as "tar-water" has been proposed as a substitute for the mixing-water for artificial stone. I do not claim this as my invention, and whatever its effects may be when applied to artificial-stone making this tar-water is of no use in bringing about the results obtained by my composition, where something approaching the nature of light oil is required. On the other hand, my composition is not at all suitable for artificial-stone making, its application being limited to forming a bond, as described above.

What I claim as my invention, and desire to secure by Letters Patent, is—

The composition consisting of the extract of coal-tar obtained by digesting the latter in hot water and combined with hydraulic cements, so as to anneal the same.

In testimony whereof I have signed my name to this specification in the presence of two subscribing witnesses.

H. J. LIVINGSTON.

Witnesses:
   JAMES H. ALFORD,
   JAMES KEAN.

*Goodrich et al, #196,219, Oct. 16, 1877 (106-32)*